(12) United States Patent
Walter et al.

(10) Patent No.: US 8,970,955 B2
(45) Date of Patent: Mar. 3, 2015

(54) ZERO-ORDER DIFFRACTIVE FILTER AND METHOD FOR MANUFACTURING THEREOF

(75) Inventors: Harald Walter, Horgen (CH); Alexander Stuck, Wettingen (CH)

(73) Assignee: CSEM Centre Suisse d'Electronique et de Microtechnique SA—Recherche et Developpement, Neuchatel (CH)

( * ) Notice: Subject to any disclaimer, the term of this patent is extended or adjusted under 35 U.S.C. 154(b) by 274 days.

(21) Appl. No.: 12/815,726

(22) Filed: Jun. 15, 2010

(65) Prior Publication Data

US 2010/0315713 A1 Dec. 16, 2010

Related U.S. Application Data

(60) Provisional application No. 61/213,503, filed on Jun. 15, 2009.

(51) Int. Cl.

| | |
|---|---|
| *G02B 5/18* | (2006.01) |
| *G02B 27/44* | (2006.01) |
| *B42D 25/29* | (2014.01) |
| *B42D 25/328* | (2014.01) |

(52) U.S. Cl.
CPC ............ *G02B 5/1809* (2013.01); *G02B 5/1847* (2013.01); *G02B 27/44* (2013.01); *B42D 25/29* (2014.10); *B42D 25/328* (2014.10)
USPC ............................. 359/568; 359/567; 359/576

(58) Field of Classification Search
CPC ........ G02B 5/18; G02B 8/1866; B42D 25/30; B42D 25/328
USPC ................................. 359/2, 566–576; 283/86
See application file for complete search history.

(56) References Cited

U.S. PATENT DOCUMENTS

| | | |
|---|---|---|
| 4,484,797 A | 11/1984 | Knop et al. |
| 2003/0017580 A1 | 1/2003 | Cunningham et al. |

(Continued)

FOREIGN PATENT DOCUMENTS

| | | |
|---|---|---|
| EP | 1862827 | 12/2007 |
| EP | 1990661 | 11/2008 |

(Continued)

OTHER PUBLICATIONS

Gale, M.T., "Zero-Order Grating Microstructures" in R.L. van Renesse, Optical Document Security, 2nd Ed., pp. 267-287.

(Continued)

*Primary Examiner* — Stephone B Allen
*Assistant Examiner* — Kimberly N Kakalec
(74) *Attorney, Agent, or Firm* — Young & Thompson (57) ABSTRACT

The present invention discloses a method for manufacturing a zero-order diffractive filter comprising a high-index material having an upper surface and a lower surface. The high-index material is positioned between a first low-index matter and a second low-index matter; the lower surface is adjacent to said first low-index matter and the upper surface is adjacent to the second low-index matter. Moreover, the high-index material has an index of refraction that is higher than the index of refraction of both said first low-index matter and said second low-index matter. The method comprises at least the following procedure: selectively providing, by employing at least one wet-coating technique, at least one of the following at least partially: the high-index material onto said first low-index matter.

12 Claims, 6 Drawing Sheets

(56) References Cited

U.S. PATENT DOCUMENTS

| | | | |
|---|---|---|---|
| 2003/0058491 A1* | 3/2003 | Holmes et al. | 359/2 |
| 2003/0230816 A1 | 12/2003 | Kappe et al. | |
| 2006/0077496 A1* | 4/2006 | Argoitia et al. | 359/2 |
| 2007/0053028 A1* | 3/2007 | Ezra | 359/2 |
| 2007/0285782 A1 | 12/2007 | Stuck et al. | |
| 2008/0024866 A1 | 1/2008 | Walter et al. | |
| 2008/0225391 A1 | 9/2008 | Walter et al. | |
| 2008/0231976 A1* | 9/2008 | Commander et al. | 359/833 |

FOREIGN PATENT DOCUMENTS

| | | |
|---|---|---|
| WO | WO2004077468 | 9/2004 |
| WO | WO2006038120 | 4/2006 |

OTHER PUBLICATIONS

Mercado, R. et al., "Thin-film polyetherimides with controlled refractive indices," Organic Photonic Materials and Devices VI. Edited by Grote, James G.; Kaino, Toshikuni. Proceedings of the SPIE, vol. 5351, pp. 276-283 (2004).

Flaim, T. et al., "High-refractive-index polymer coatings for optoelectronics applications," Advances in Optical Thin Films. Edited by Amra, Claude; Kaiser, Norbert; Macleod, H. Angus. Proceedings of the SPIE, vol. 5250, pp. 423-434 (2004).

Zimmermann, L. et. al., "High refractive index films of polymer nanocomposites," J. Mater. Res., vol. 8(7), 1993, p. 1742-1748.

Solaronix http://www.solaronix.com/products/spincoatingtitania/tinanoxidehtlsc/, website visited Jun. 14, 2010.

* cited by examiner

ZERO-ORDER DIFFRACTIVE FILTER AND METHOD FOR MANUFACTURING THEREOF

CROSS-REFERENCE TO RELATED APPLICATIONS

This patent application claims priority from U.S. Provisional Application 61/213,503 filed on Jun. 15, 2009, the disclosure of which is incorporated herein by reference in its entirety.

FIELD OF THE INVENTION

The present invention relates to the field of optical diffractive devices in general, and more specifically, to the field of zero-order diffractive filters.

DESCRIPTION OF THE FIGURES

These and further features and advantages of the invention will become more clearly understood in the light of the ensuing description of the embodiments thereof, given by way of example only, with reference to the accompanying figures, wherein.

BACKGROUND OF THE INVENTION

Zero-order diffractive filters (ZOFs), sometimes dubbed resonant gratings or guided mode resonant filters, are optical filters that are based on the resonant reflection of a leaky waveguide. Illuminated for example with non-polarized, polychromatic light, ZOFs can show characteristic color effects upon rotation and are therefore clearly identifiable.

ZOFs known in the art employ a waveguiding layer that has a diffractive microstructure defining at least one of its waveguiding boundaries. The diffractive microstructures, or otherwise stated, the diffractive gratings are isotropic, parallel or crossed. They possess a period $\Lambda$ and a depth t. The period $\Lambda$ is in most cases smaller than the wavelength of light for which ZOF is designed.

The waveguiding layer has a thickness c and is made of a material having an index of refraction $n_{high}$ that is higher than index of refraction ($n_{low}$) of the matter surrounding the waveguiding layer. The waveguiding layer is thus sometimes referred to as high-index waveguiding material or layer, and the matter surrounding the high-index waveguiding layer is sometimes referred to as low-index matter or layer. The low-index matter can have different indices of refraction. For example, a first low-index matter can be a solid substrate, whilst a second low-index matter can be ambient air, as outlined herein below in greater detail with reference to FIG. 2.

Figure 1A:
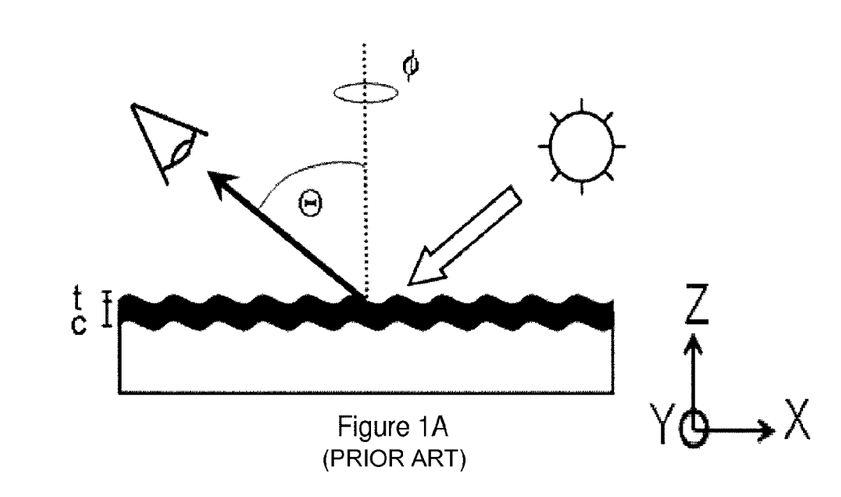
FIG. 1A is a schematic side-view illustration of a zero-order diffractive filter according to the prior art.
Figure 1B:
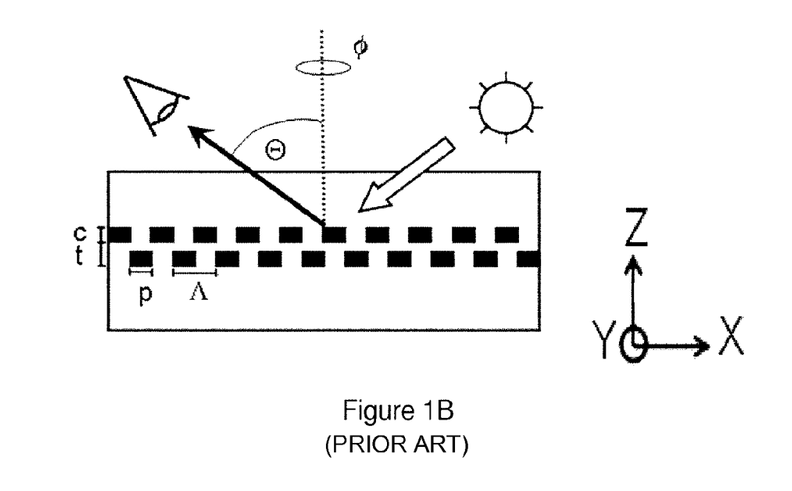
FIG. 1B is a schematic side-view illustration of another zero-order diffractive filter according to the prior art.

In order to obtain zero-order diffraction color effects that are recognizable by the human eye, a number of parameters have to be adjusted including grating period $\Lambda$, grating depth t, thickness c of the waveguiding layer, fill factor or duty cycle f.f.=p/$\Lambda$, grating profile or shape (rectangular, sinusoidal (cf. FIG. 1A), triangular or more complex) and the indices of refraction $n_{high}$ and $n_{low}$. The diffractive grating can be exposed to ambient air (cf. FIG. 1B).

Figure 2:
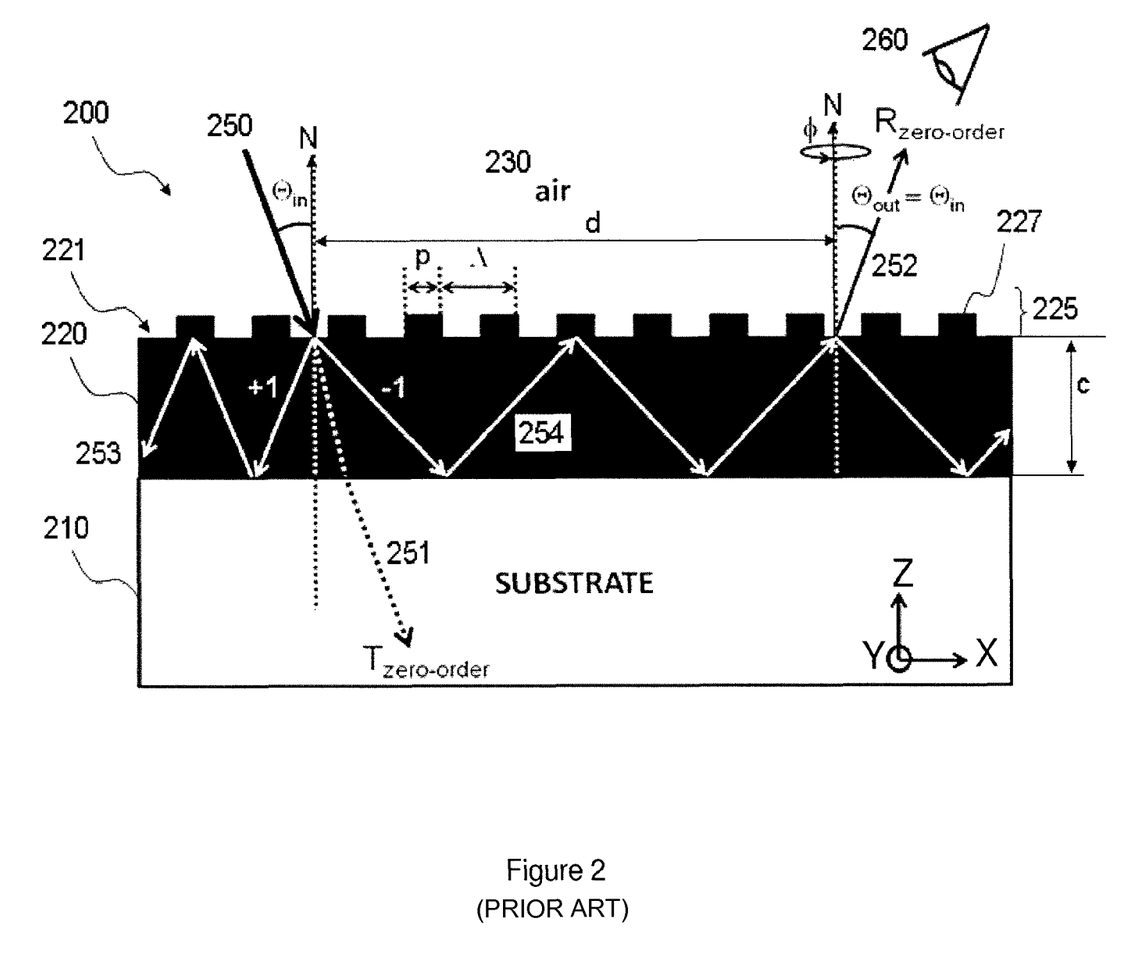
FIG. 2 is a schematic side-view illustrate of the propagation of light in a yet other zero-order diffractive according to the prior art.

Referring now to FIG. 2, a ZOF 200 as known in the art comprises in the x/y-plane a waveguiding layer 220 having lower boundary 222 engaging with a substrate 210. Upper boundary 221 of waveguiding layer 220 is formed as a diffractive grating 225, which includes a plurality of protrusions 227 that are spaced apart from one another, and which is at the interface between waveguiding layer 220 and ambient air 230. The physical properties of diffractive grating 225 are at least defined by its physical dimensions, and more specifically, by its grating period $\Lambda$, the width p of protrusions 227 and thickness c of waveguiding layer 220. The fill factor (ff) or duty cycle of diffractive grating 225, can be defined as ff=p/$\Lambda$ and may be at least approximately equal 0.5 or 50%. Waveguiding layer 220 has an index of refraction that is higher than that of air and that of substrate 210.

Thusly configured, at least some of polarized or unpolarized polychromatic visible light 250 incident on diffractive grating 225 at an illumination angle $\Theta_{in}$ is coupled in waveguiding layer 220. Specifically, ZOF 200 may enable the resonant coupling of light of several diffraction orders and thus of several wavelengths into waveguiding layer 220. The diffraction orders and the wavelengths that will be coupled into waveguiding layer 220 depend on at least one parameter of diffractive grating 225, the thickness c of the waveguiding layer 220 and differences in the index of refraction between waveguiding layer 220, substrate 210 and ambient air 230.

In FIG. 2, the resonant coupling of incident light 250 into waveguiding layer 220 is schematically shown and exemplified as "+1" order light 253 and "−1" order light 254 having orders +1 and −1, respectively. Due to the higher index of refraction of waveguiding layer 220 compared to the one of ambient air 230 and substrate 210, "+1"-order light 253 and "−1"-order light 254 are totally internally reflected from upper boundary 221 and lower boundary 222 of waveguiding layer 220. However, a first portion of the zeroth-order (hereinafter: first zeroth-order light) 251 of incident light 250 is directly transmitted through waveguiding layer 220 and leaves ZOF 200 by propagation through substrate 210. In addition, a second portion of the zeroth-order (hereinafter: second zeroth-order light) 252 of light 250 is diffracted together with "−1" order light 254 into waveguiding layer 220. Both second zeroth-order light 252 and "−1"-order light 254 propagate in waveguiding layer 220 in opposite directions. After propagating over distance d in waveguiding layer 220, second zeroth-order light 252 is coupled out via diffractive grating 225.

"+1" order light 253 and "−1" order light 254 may continue propagating in waveguiding layer 220. In contrary to what is true for diffraction orders that are higher than zero, the angle $\Theta_{out}$ (which is defined with respect to the normal N of waveguiding layer 220) of the outcoupled second zeroth-order light 252 is equal to $\Theta_{in}$.

The resonance condition for the outcoupling of first zeroth-order light 251 and second zeroth-order light 252, can be tailored for a certain wavelength or wavelength range for the outcoupled light. For example, the wavelength(s) of second zeroth-order light 252 outcoupled via diffraction grating 225 depends both on the viewing angle $\Theta_{out}$ and the rotational orientation φ of diffractive grating 225 with respect to a viewer 260. For each pair of angles φ and $\Theta_{out}$ a particular spectral range or color is reflected or transmitted.

The spectral characteristics of such ZOFs are therefore tuneable. The reflection spectra $R_{zero\text{-}order}$ or transmission spectra $T_{zero\text{-}order}$ are the most prominent examples of the spectral characteristics of ZOFs.

As long as the materials employed in a ZOF possess no substantial absorption, the transmission spectra are the complement of those in reflection.

More details concerning zero-order diffractive filters can be found in M. T. Gale, "Zero-Order Grating Microstructures" in R. L. van Renesse, Optical Document Security, $2^{nd}$ Ed., pp. 267-287.

Due to the above-outlined color effects which are characteristic for ZOFs, they can be employed in conjunction with a variety of applications such as security-related, sensor-related, and pigment-related applications. Security-related applications include the employment of ZOFs in anti-counterfeiting or forgery protection of, for example, documents (e.g., passports, visas, government forms); products (e.g., pharmaceuticals); and payment instruments (e.g., banknotes, credit cards, tickets and cheques); smart cards; and the like.

Document U.S. Pat. No. 4,484,797 teaches a variable index-of-refraction optical medium of certain minimum thickness and periodicity with respect to the wavelength of incident light-if it meets certain specified constraints with respect to (1) relative indices-of-refraction of both its internal structure and that of its surroundings and (2) relative values of incident wavelength to periodicity and the relative indices-of-refraction-operates to produce both angularly-dependent subtractive-color filter reflection spectra and subtractive-color filter transmission spectra in accordance with its physical parameters. The methods for manufacturing the device taught in are based on vacuum deposition steps. Specifically, the medium is manufactured as laminated foil in roll-to-roll processes with thermally evaporated ZnS as the waveguiding layer deposited on foil substrates which were micro-structured by hot-embossing.

Document WO2006038120 teaches a security device comprising first zero order diffractive microstructure on a substrate, a second zero order diffractive microstructure, and an intermediate light transmissive layer, separating the two diffractive microstructures. The spacing between the first and second diffractive microstructures is small enough so that optical interferences are produced between the diffractive microstructures. A further light transmissive layer covers the second diffractive microstructure.

Document US2008024866 teaches ZOFs comprising a first layer having periodic diffractive microstructures and a second layer, wherein said first layer has a refractive index higher than said second layer by at least 0.2, and nanoparticles located in at least one of said layers which affect the refractive index of said at least one of said layers. The present invention further relates to methods of manufacturing such ZOFs, to the use such ZOFs e.g. in security devices and to the use of specific materials for manufacturing ZOFs. The manufacturing method disclosed is based on water based deposition of a porous layer on a foil substrate in a roll-to-roll process followed by a water based deposition of a polymeric waveguide layer and a subsequent microstructure embossing of the water soluble polymeric waveguide layer Document WO2004/077468 teaches a grid structure used for protecting valuable articles. The inventive structure consist of at least a first part provided with a grid constant which is less than a wavelength at which said part is observable and embodied in the form of a relief structure whose relief height is defined in such a way that the zero-order grid image can be observed in a determined spectral range. Said part has a size less than 0.5 mm at least in one direction. For the manufacturing of the disclosed high-index refracting waveguide, vacuum-based deposition is disclosed.

US2003017580 teaches a manufacturing method of a ZOF employable as a biosensor. Specifically, US2003017580 teaches a method for fabrication of a calorimetric resonant reflection biosensor structure comprising: (a) applying a liquid or semi-solid material that is capable of being transformed or cured into a flexible solid over a rigid master structure; (b) transforming the liquid or semi-solid material into a flexible master structure, wherein the flexible master structure has the rigid master structure embossed into a first surface of the flexible master structure; (c) peeling the flexible master structure from the rigid master structure; (d) placing the first surface of the flexible master structure onto a liquid or semi-solid layer, wherein the liquid or semi-solid layer is on a rigid substrate; (e) transforming or curing the liquid or semi-solid layer into a solid layer; (f) peeling the flexible master structure from the solid layer; and (g) applying a high refractive index dielectric film or reflective material over the solid layer, whereby a calorimetric resonant reflection biosensor structure is fabricated.

Document US2007285782 teaches one or more zero-order diffractive pigments (ZOP) having both a particle distribution matrix material, and a layer of material in or on such a matrix material and having an index of refraction higher than that of the matrix material, and having a diffractive grating structure with a period in the range of 100 to 600 nm, which is smaller than the wavelength of light reflectable thereby in the zeroth reflection order. In such ZOPs the index of refraction of the matrix material is usually at least 0.25 less than that of the material of the layer, and the layer is typically of a thickness between 30 and 500 nm.

DESCRIPTION OF THE INVENTION

It should be noted that the various embodiments, preferences and ranges as provided/disclosed in this specification may be combined at will. Further, depending of the specific embodiment, selected definitions, embodiments or ranges may not apply.

It should be noted that the term "first low-index matter" and "second low-index matter" may be interchangeably be used with term "first low-index layer" and "second low-index layer", where the matter is a solid material.

It should be noted that term "low-index" and "high-index" as used herein are terms which are to be interpreted in relation to one another with reference to the same device. For example, a low-index material or matter in a first device has a lower index of refraction than a high-index waveguide layer of the same first device. However, a first low-index matter of the first device may have a higher index of refraction than a first low-index matter of a second device.

It should be noted that the term high-index material may be interchangeably be used with the term "waveguiding layer" or "high-index waveguiding layer".

It should be noted that the term "lateral" as used herein refers to any direction that is defined by the X and Y coordinates. Accordingly, the term "vertical" as used herein refers to Z-direction.

The terms "right", "left", "bottom", "below", "lower", "top", "above", "elevated" and "upper" as well as grammatical variations thereof as used herein do not necessarily indicate that, for example, a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

It should be noted that in respective embodiments of the invention, the term "determining" as used herein may refer to methods whose output may be an estimate of a parameter.

SUMMARY OF THE INVENTION

The present invention discloses a method for manufacturing a zero-order diffractive filter comprising at least two adjacent layers, which are formed by high-index material having an upper surface and a lower surface; first low-index matter; and second low-index matter. The high-index material is positioned between the first low-index matter and the second low-index matter. The lower surface is adjacent to the first low-index matter and the upper surface is adjacent to the second low-index matter. The high-index material has an index of refraction that is higher than the index of refraction of both the first low-index matter and the second low-index matter.

In embodiments, the method includes at least the following procedure: a) providing the high-index material laterally patterned onto the low-index matter by employing at least one wet-coating technique.

In embodiments, the method for manufacturing the zero-order diffractive filter comprises at least the following procedure after step a): b) providing the second low-index matter onto at least the high-index material by employing at least one wet-coating technique.

In embodiments, the method for manufacturing the zero-order diffractive filter comprises selectively microstructuring, at least one of the following at least partially: a lower diffractive structure on the lower surface; and an upper diffractive grating structure on the upper surface.

In embodiments, the method for manufacturing the zero-order diffractive filter comprises the procedure determining whether the at least two adjacent layers meet at least one compatibility criterion, prior to performing at least one of step a), and step b).

In embodiments, the microstructuring comprises at least one of the following: hot-embossing, and UV-embossing.

In embodiments, the wet-coating technique comprises printing.

In embodiments, the microstructuring comprises employing temperature ranging from 50° C. to 200° C.

In embodiments, the method for manufacturing the zero-order diffractive filter comprises: providing on the first low-index matter an initial diffractive structure prior to step a); and wherein providing the lower diffractive structure onto the high-index material comprises: providing the high-index material on at least a part of the initial diffractive structure such to obtain on the lower surface the lower diffractive structure which corresponds with the initial diffractive structure.

In embodiments, the method for manufacturing the zero-order diffractive filter comprises providing the upper diffractive grating structure on the high-index material after step a) and prior to step b).

A zero-order diffractive filter according to an embodiment of the invention comprises the high-index material that is laterally patterned on the low-index matter, such that said the zero-order diffractive filter comprises at least one high-index-free area wherein the first low-index matter and the second low-index matter are adjacent to each other.

In embodiments, the at least one area the index of refraction of the first low-index matter is at least approximately equal to the index of refraction of the second low-index matter.

In embodiments, the high-index-free area is substantially free of diffraction.

In embodiments, the high-index material between the first and the second low-index matter has predetermined vertical dimensions.

In embodiments, the high-index material has an index of refraction n that is higher than 1.8, higher than 1.9, or higher than 2.

In embodiments, the high-index material comprises nano-structured material.

In embodiments, the high-index material comprises organic material.

In embodiments, the laterally patterned high-index material is patterned in the shape of a logo or text or numbers or barcodes.

DETAILED DESCRIPTION OF THE INVENTION

It is an objective of the underlying invention to teach alternative zero-order diffractive filters which include high-index waveguiding material that is laterally structured or patterned. Moreover, a waveguiding boundary of the high-index waveguiding material, includes, at least partially, a diffractive grating. It is further an object of the invention to teach alternative manufacturing methods for zero-order diffractive filters. Such alternative manufacturing methods employ according to an embodiment of the invention wet-coating techniques like, for example, printing and/or embossing. Such wet-coating techniques are relatively low-cost and enable a higher output compared to manufacturing methods that are based on vacuum deposition. By employing wet-coating techniques according to embodiments of the invention for the manufacturing of ZOFs, the latter remains non-subjected to the phenomenon of swelling and/or dissolution. Furthermore, ZOFs that include water soluble layers cause problems in applications where products comprising such ZOFs have to withstand various tests such, for example, washing machine test for banknotes.

According to an embodiment of the invention, the difference between the index of refraction $n_{high}$ of the high-index material and the index of refraction $n_{low}$ of the surrounding low-index matter may be, for example, at least 0.1, 0.15, and 0.2

According to embodiments of the invention, $n_{low}$ may for example have values ranging from 1.1 to 1.7; and $n_{high}$ may be, for example, at least 1.8, at least 1.9, or at least 2.0.

According to embodiments of the invention, parameters for the diffractive grating and the high-index waveguiding material may be as outlined herein below in

TABLE 1

| Parameter | Suitable range | Preferred range | Especially preferred range |
|---|---|---|---|
| period Λ | 100-1700 nm | 200-900 nm | 250-500 nm |
| thickness c | 30-1000 nm | 50-400 nm | 100-300 nm |
| depth t | 50-600 nm | 80-400 nm | 100-200 nm |
| fill factor f.f. | 0.1-0.9 | 0.3-0.8 | 0.4-0.7 |

Wet-Coating Techniques and Polymer Solubility

According to an embodiment of the invention, the method for manufacturing a ZOF includes the procedure of determining the compatibility between two layers of material according to at least one compatibility criterion, which will be outlined in greater detail herein below. If it is determined that the two layers are sufficiently compatible, then wet-coating techniques according to embodiments of the invention are employed for the manufacturing of a zero-order diffraction filter, which includes the two layers adjacent to one another. Sufficient compatibility between the solvent of overprinting material and a micro-structured and wet-coated layer is of high importance because in case of insufficient compatibility, the solvent of the overprinting may destroy the micro-structure forming the diffractive grating due to, e.g., swelling and/or dissolution of the microstructure. Whether or not a solvent dissolves and/or swells a layer containing organic material depends on the solubility of the organic material in this solvent. Many different types and possible classification for solvents exist. Solvents may for example be classified according to their polarity index, a relative measure indicating the degree of interaction of the solvent with various polar test solutes.

Table 2 below exemplifies several solvents and with their corresponding polarity index. Most of the data listed in the following tables are taken from "CRC handbook of solubility parameters and other cohesion parameters", Allan F. M. Barton, Edition: 2, CRC Press, 1991, p. 292 and p. 406, ISBN 0849301769. In Table 2 below, the solvents are listed in order of increasing polarity index.

TABLE 2

Polarity index for various solvents

| Solvent | Polarity Index (P) | Solvent | Polarity Index (P) |
|---|---|---|---|
| Polyfluorohexane | −0.84 | n-Butyl Acetate | 4.0 |
| Pentane | 0.0 | Isobutyl Alcohol | 4.0 |
| 1,1,2-Trichlorotrifluoroethane | 0.0 | Methyl Isoamyl Ketone | 4.0 |
| Cyclopentane | 0.1 | n-Propyl Alcohol | 4.0 |
| Heptane | 0.1 | Tetrahydrofuran | 4.0 |
| Hexane | 0.1 | Chloroform | 4.1 |
| Iso-Octane | 0.1 | Methyl Isobutyl Ketone | 4.2 |
| Petroleum Ether | 0.1 | Ethyl Acetate | 4.4 |
| Cyclohexane | 0.2 | Methyl Acetate | 4.4 |
| n-decane | 0.3 | Methyl n-Propyl Ketone | 4.5 |
| i-octane | 0.4 | Cyclohexanone | 4.5 |
| n-Butyl Chloride | 1.0 | Methyl Ethyl Ketone (MEK) | 4.7 |

TABLE 2-continued

Polarity index for various solvents

| Solvent | Polarity Index (P) | Solvent | Polarity Index (P) |
|---|---|---|---|
| Carbon disulfide | 1.07 | 1,4-Dioxane | 4.8 |
| Tetrachloromethane | 1.56 | Acetone | 5.1 |
| Carbon tetrachloride | 1.7 | Methanol | 5.1 |
| i-propyl ether | 2.2 | Ethanol | 5.2 |
| Toluene | 2.4 | Pyridine | 5.3 |
| Methyl t-Butyl Ether | 2.5 | 2-Methoxyethanol | 5.5 |
| o-Xylene | 2.5 | Acetonitrile | 5.8 |
| Chlorobenzene | 2.7 | Propylene Carbonate | 6.1 |
| o-Dichlorobenzene | 2.7 | Acedic acid | 6.2 |
| Ethyl Ether | 2.8 | N,N-Dimethylformamide | 6.4 |
| Dichloromethane | 3.1 | Dimethyl Acetamide | 6.5 |
| Benzene | 3.0 | Menthanol | 6.6 |
| Chloroform | 3.4-4.4 | N-Methylpyrrolidone | 6.7 |
| Ethylene Dichloride | 3.5 | Dimethyl Sulfoxide | 7.2 |
| Anisole | 3.87 | Formamide | 7.3 |
| n-Butyl Alcohol | 3.9 | Water | 9.0-10.2 |
| Isopropyl Alcohol | 3.9 | | |

In an embodiment of the invention wherein two layers, each layer including organic material (e.g., polymers) dissolved in solvents, shall be deposited on top of each other. The at least one compatibility criterion may for example refer to a minimal difference in the polarity index between the two layers. The difference in the polarity indices between the two layers may be for example at least 0.25, 0.5, or 1.

Besides organic material, other types of matter comprised in a layer such as, for example, plasticizers, may cause the dissolving and/or swelling of an adjacent layer containing organic material. More particularly, organic material may be dissolved, if the free energy for blending $\Delta G_m$, which is defined herein below in equation 1:

$$\Delta G_m = \Delta H_m - T \cdot \Delta S_m \quad (1)$$

wherein $\Delta H_m$ is the blending enthalpy, T the temperature and $\Delta S_m$ the blending entropy. The latter is positive if blending takes place. By determining the blending enthalpy, it may be determined whether or not a layer containing organic material dissolves when engaging with a solution that contains plasticizers.

To simplify the discussion that follows and for exemplary purposes only, a two component system comprising one polymer and one solvent is considered, wherein according to J. H. Hildebrand the approximation outlined in equation 2 may be performed:

$$\Delta H_m = V_m \cdot [(\Delta H_{V1}/V_1)^{0.5} - (\Delta H_{V2}/V_2)^{0.5}]^2 \cdot \phi_1 \cdot \phi_2 \quad (2)$$

wherein $V_m$ represents the total volume of the blended mixture, $\Delta H_{V1}$ and $\Delta H_{V2}$ the molar vaporization heat or latent heat; $V_1$ and $V_2$ the molar volumes; and $\phi_1$ and $\phi_2$ the volume fractions of component 1 and 2, respectively.

The ratio $\Delta H_V/V$ is referred to as the cohesive energy density, which is defined as the amount of energy needed to completely remove a unit volume of molecules from their neighbors to infinite separation, assuming an ideal gas. The cohesive energy density is equal to the heat of vaporization divided by molar volume. In order for a material to dissolve, the attracting interactions need to be overcome such that molecules surrounded by a solvent are separated from each other and therefore dissolved. J. H. Hildebrand suggested the square root of the cohesive energy density as a quantitative indication of solvency behavior, which is known as the "Hildebrand solubility parameter" δ outlined in equation:

$$\delta = (\Delta H_V/V)^{0.5} \quad (3)$$

The Hildebrand solubility parameter provides a quantitative estimate of the degree of interaction between materials, and is used according to an embodiment of the invention as an indicator with regards to solubility of a first matter in second matter, and particularly for the solubility of non-polar materials like, for example, at least some polymers.

The more equal the Hildebrand solubility parameter of two different matters are, the more likely are they to interact with each other in a manner that causes solvation and/or miscibility and/or swelling. Accordingly, the Hildebrand solubility parameter enables to predict the interaction between two matters of non-polar and slightly polar systems that are free of hydrogen bonding. The Hildebrand solubility parameter may, for example, be applied for predicting interaction, or more specifically, for example, the solubility and/or swelling between of a polymer by a solvent.

Now, applying by equation 3 to equation 2 leads to equation 4 below:

$$\Delta H_m/(V_m \cdot \phi_1 \cdot \phi_2) = (\delta_1 - \delta_2)^2 > 0 \quad (4)$$

From Equation 4 it can be concluded that the more the solubility parameters differ, the less soluble is a polymer in a solvent.

According to some embodiments of the invention, solubility-reducing procedures may be performed on matter to at least reduce solubility or to render the matter insoluble a solvent. Such solubility-reducing procedures may include, for example, performing cross-linking on matter containing organic material. Cross-linking may, include, for example, ultraviolet cross-linking of, e.g., a polymer layer.

According to some embodiments of the invention, additional or alternative solubility-reducing procedures like, e.g. heat treatments or pressure, may be employed in cases where cross-linking may be not suffice to prevent swelling and the resulting destructing of diffractive microstructures.

Table 2 exemplifies some values of δ for solvents, Table 3 for polymers and Table 4 for plasticizers. It should be noted that the solvents, polymers and plasticizers exemplified herein are by no means to be construed as limiting.

TABLE 2

Solubility parameter δ for various solvents

| Solvent | δ [MPa$^{1/2}$] | Solvent | δ [MPa$^{1/2}$] |
|---|---|---|---|
| n-Pentane | 14.4 | Acetone | 19.7 |
| n-Hexane | 14.9 | Chlorobenzene | 20.0 |
| Heptane | 15.0 | Dichloromethane | 20.2 |
| Diethyl Ether | 15.4 | Cyclohexanone | 20.2 |
| Cyclohexane | 17.0 | Dioxane | 21.0 |
| Isopropyl acetate | 17.6 | 2-propanol | 23.8 |
| Propyl acetate | 17.9 | Ethanol | 26.2 |
| Ethyl acetate | 18.2 | Ethylene glycol | 35.0 |
| Chloroform | 18.7 | Glycerol | 36.0 |
| Methyl ethyl ketone | 19.0 | | |

TABLE 3

Solubility parameter δ for various polymers

| Polmyer | δ [MPa$^{1/2}$] | Polymer | δ [MPa$^{1/2}$] |
|---|---|---|---|
| PTFE | ≈12.4 | PVC | 19.5 |
| Poly(ethylene) | ≈15.8 | PET | 20.5 |
| Poly(propylene) | 16.6 | Nylon 6,6 | 28 |
| Poly(styrene) | ≈18.2 | PMMA | 19.0 |

TABLE 4

Solubility parameter δ for various plasticizers

| Plasticizers | δ [MPa$^{1/2}$] | Plasticizers | δ [MPa$^{1/2}$] |
|---|---|---|---|
| Myvacet | 17.4 | Diethylsebacat | 18.4 |
| Acetyltributylcitrat | 18.4 | Dibutylphthalat | 19.6 |
| Aceyltriethylcitrat | 19.9 | Diethylphthalat | 20.7 |
| Tributylcitrat | 20.4 | Dimethylphthalat | 22.0 |
| Triethylcitrat | 22.2 | 1,2 Propylen-glykol | 31 |
| Dibutylsebacat | 17.9 | Glycerol-triacetat | 20.8 |

According to some embodiments of the invention, the at least one compatibility criterion relates to the interaction parameter from the Flory-Huggins theory. Specifically, the Hildebrand solubility parameter δ is linked to the interaction parameter $\chi_{12}$ from the Flory-Huggins theory according to the following equation 5:

$$\chi_{12} = (V_m/RT) \cdot (\delta_1 - \delta_2)^2 \quad (5)$$

The interaction parameter is both temperature and molecular weight dependent but concentration independent. For polymers of high molecular weight the entropic contribution is very small and the miscibility or immiscibility of the system mainly depends on the value of the enthalpy of mixing. In this case, a negative value for the interaction parameter indicates miscibility. However, miscibility may be existent, for example, for values that are below 0.01, e.g., for some polymers used in printing applications in a solvent. As a consequence, increased values equal above 0.01 for the interaction parameter indicate increased compatibility.

According to some embodiments of the invention, the method for manufacturing a ZOF may include the procedure of determining the interaction parameter of a first polymer in a solvent. If the interaction parameter of the first polymer with the solvent meets the at least one compatibility criterion, i.e., the interaction parameter is sufficiently high, the method may further include the procedure of depositing the first polymer as a first layer, and the deposition of a second polymer as a second layer on top of the first layer by employing the respective solvent. According to some embodiments of the invention, the interaction parameter between the first polymer and the solvent may be, for example, at least 0.01, at least 0.05, at least 0.25, or at least 0.5, if the first layer should not be dissolved and/or swelled upon the deposition of the second layer due the employment of the solvent.

The interaction parameter for various polymer-solvent combinations is exemplified herein below in Table 5.

TABLE 5

Flory-Huggins interaction parameter $\chi_{12}$

| Polymer$_1$ | Solvent$_2$ | $\chi_{12}$ | Polymer$_1$ | Solvent$_2$ | $\chi_{12}$ |
|---|---|---|---|---|---|
| PMMA | p-Xylol | 0.498 | PS | Toluene | 0.343 |
| PMMA | Acetone | 0.18 | PS | p-Xylol | 0.025 |
| PMMA | Ethyl acetate | 0.36 | PS | MEK | 0.725 |
| PMMA | Butanol | 0.67 | PVAc | Hexane | 1.09 |
| PBMA | nC$_{10}$ | 1.20 | PVAc | Methanol | 0.71 |
| PBMA | Xylene | 0.41 | PVAc | Ethanol | 0.63 |
| PBMA | CHCl$_3$ | 0.14 | PVAc | Nitromethane | 0.43 |
| PBMA | Acetone | 0.2 | PVAc | THF | 0.05 |
| PBMA | Ethyl acetate | 0.27 | PDMS | Cyclohexan | 0.41 |

TABLE 5-continued

Flory-Huggins interaction parameter $\chi_{12}$

| Polymer$_1$ | Solvent$_2$ | $\chi_{12}$ | Polymer$_1$ | Solvent$_2$ | $\chi_{12}$ |
|---|---|---|---|---|---|
| PBMA | Ethanol | 1.01 | PDMS | Diisobutylketon | 0.49 |
| PEMA | MEK | 0.09 | PDMS | Hexadimethyldisiloxan | 0.25 |
| PEMA | Diethyl ether | 0.57 | PDMS | Octamethyltrisiloxan | 0.17 |
| PEMA | Nitropronane | 0.11 | PDMS | n-Octan | 0.51 |
| PnBA | p-Xylol | 0.444 | PDMS | Toluol | 0.72 |

According to some embodiments of the invention, additional or alternative solubility parameters such as, for example, 3-Dimensional Solubility Parameters like, e.g., Hansen Solubility Parameters, may be employed for determining the solubility of polar molecules.

Printed Zero-Order Diffractive Filter

According to some embodiments of the invention, the manufacturing of a Zero-Order Diffractive includes the employment of at least one wet-coating technique. In some embodiments, solely wet-coating techniques may be employed.

According to some embodiments of the invention, a wet-coating technique for the deposition of layers is employed if it is determined that the above-mentioned at least one compatibility criterion is met.

According to some embodiments of the invention, a wet-coating technique that may be employed for the manufacturing of a ZOF may include, for example, at least one of the following processes: spreading; brushing; coating; pouring; spraying; printing; roller coating methods; and any other wet-coating manufacturing process, e.g., as known in the art.

According to some embodiments of the invention, printing processes may for include, for example, at least one of the following: screen printing; flexography; digital printing methods; gravure printing, ink-jet printing; and any other printing method, e.g., as known in the art.

Figure 3A:
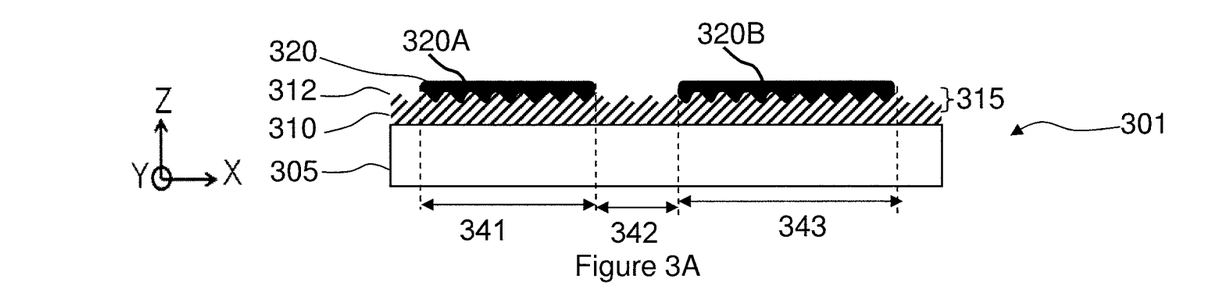
FIG. 3A is a schematic illustration of a zero-order diffractive filter according to an embodiment of the invention.

Reference is now made to FIG. 3A. A ZOF 301, according to an embodiment of the invention, includes a substrate 305; a layer of embossable first low-index matter 310 having an upper surface 312; a layer of high-index (waveguiding) material 320; and second low-index matter 330. First low-index matter 310 is deposited on substrate 305 such to cover substrate 305 at least partially. Moreover, first low-index matter 310 may be positioned between substrate 305, and below either one high-index material 320 (sandwich area) and second low-index matter 330 (merged area), depending on the lateral position in a ZOF according to an embodiment like, e.g., ZOF 301. For example in merged areas 342, first low-index matter 310 and second low-index matter 330 engage with one another, whereas in sandwich positions 341 and 343, high-index material 320 is positioned between first low-index matter 310 and second low-index matter 330. A second low-index matter of a ZOF according to an embodiment of the invention may be, for example, ambient air.

In an embodiment of the invention, and as is schematically illustrated an exemplified with respect to FIG. 3A, first low-index matter 310 may cover substrate 305 completely. In another embodiment of the invention, first low-index matter 310 may cover substrate 305 only partially (not shown). For example, first low-index matter 310 may be laterally patterned in a manner forming, e.g., individual islands of first low-index matter 310 (not shown) and/or a grid-like patterns (not shown) of first low-index matter 310, on substrate 305. According to an embodiment of the invention, embossible first low-index matter 310 may have thickness ranging, for example, from 200 nm to 10 μm.

According to some embodiments of the invention, the thickness of a first low-index matter deposited on a substrate may vary for different lateral positions on the substrate (not shown). For example, in an embodiment of the invention (not shown), a first island of the first low-index matter may be of first height $h_1$ (e.g., 200 nm), whilst a second island of the first low-index matter deposited on the substrate may have a different height $h_2$ (e.g. 500 nm). Clearly, a ZOF according to an embodiment may feature additional or alternative vertical distributions of the first low-index matter on substrate.

According to an embodiment of the invention upper surface 312 of first low-index matter 310 is at least partially formed as a lower diffractive grating structure 315. Lower diffractive grating structure 315 exemplified in FIG. 3A extends entirely over upper surface 312, i.e., diffractive grating constitutes upper surface 312. However, the embodiment described in FIG. 3A should by no means to be construed as limiting. Accordingly, in some embodiments of the invention, a grating structure may extend only some part(s) of upper surface, for example, in a laterally patterned manner. In some embodiments, the position of individual grating structures may be at least approximately aligned with the position of laterally patterned low-index matter and optionally have the at least approximately the same lateral dimensions as the laterally patterned low-index matter.

According to some embodiments of the invention, lower diffractive grating structure 315 is provided on first low-index matter 310 by employing, for example, hot-embossing and/or UV-embossing, in e.g., roll and/or batch processes.

According to some embodiments of the invention (not shown), a ZOF may be free of a substrate. Accordingly, in a ZOF according to an embodiment of the invention, first low-index matter 310 may constitute a substrate which may be made of, for example, PMMA or PC foils.

According to embodiments of the invention, the parameters (e.g., height, period, form and grating orientation, index of refraction) of a diffractive grating like, e.g., lower diffractive grating structure 315, may be uniform in ZOF 301. In some embodiments, at least one parameter of lower diffractive grating structure 315 may be non-uniform in ZOF 301. For example, the orientation of lower diffractive grating structure 315 may be different or vary with respect to the lateral its position in ZOF 301.

According to an embodiment of the invention, embossing shims may be provided for micro-structuring a diffractive grating structure like, e.g., lower diffractive grating structure 315. Specifically, such shims may be provided in step and repeat process with micro-structured areas in the shape of logos for example. The lateral size of logos implemented by ZOFs according to embodiments of the invention like, e.g., ZOF 301, may be in the millimeter in order to be resolvable by the human eye. However, in some embodiments the logos may also be of smaller size, for example, in machine-reading authenticating applications, or in combined human-eye and machine-reading applications.

According to an embodiment of the invention, high-index material 320 is provided on first low-index matter 310 by employing a wet-coating technique.

According to some embodiments of the invention, the high-index material covers the first low-index layer only partially, e.g., according to a predetermined lateral pattern or structure. For example, high-index material may be patterned to form a plurality of individual islands or spots. Each high-index island or spot may have a predetermined structure and position with respect to neighboring high-index islands, as schematically illustrated and exemplified in FIG. 3B, with respect to high-index material 320, which is laterally patterned to high-Index islands 320A and 320B. It should be noted that the lateral pattern of high-index material schematically illustrated in FIG. 3A should not be construed as limiting. Accordingly, the high-index material of a ZOF according to an embodiment of the invention may for example include more than two high-index islands that are laterally patterned such to form, for example, (with respect to the top view onto x-y plane), a plurality of at least approximately parallel stripes which may constitute, for example, a barcode. Additionally or alternatively, the plurality of high-index islands may have at least one the following predetermined shapes: an arbitrary shape; and an at least approximately circular; oval, polygonal shape; a shape representing a graphic symbol (e.g., a number, a letter, a logo). Additionally or alternatively, the high-index material may be laterally patterned such to form a macroscopic grid-like structure.

Figure 3B:
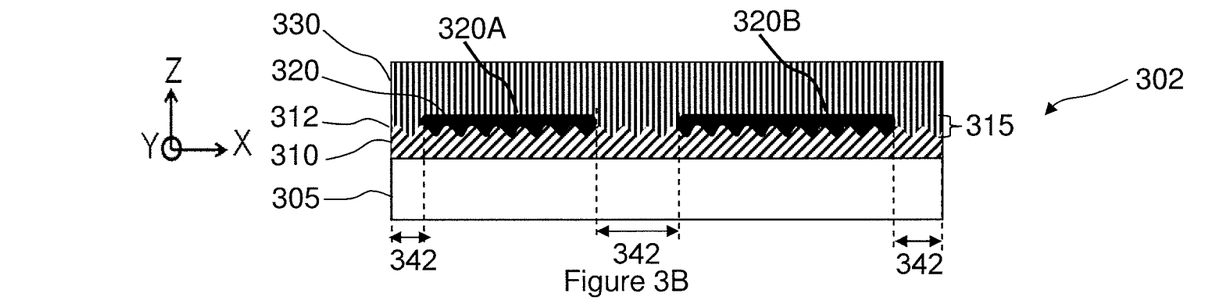
FIG. 3B is a schematic illustration of a zero-order diffractive filter according to another embodiment of the invention.

Specifically, high-index material 320 may be provided in a laterally patterned manner onto first low-index matter such that a plurality of high-index islands (e.g., high-index islands 320A and 320B) form logos, images, barcodes, and the like. Only those parts of ZOF 301 covered by high-index material 320 show the zero-order diffraction color effect.

According to an embodiment of the invention, the minimal size of each high-index island like, e.g., high-index islands 320A and 320B is at least four times the largest grating period of lower diffractive grating structure 315 in any lateral direction. The size between the outer boundaries of such high-index islands may range, for example, between 10 μm and 100 mm, between 20 μm and 20 mm, between 50 μm and 5 mm; or between 100 μm and 1 mm.

According to an embodiment of the invention, a second low-index matter may be provided, which may constitute a cover and/or a protective layer of the corresponding ZOF and specifically, of the high-index material. Accordingly, the high-index material or waveguiding layer is embedded in a ZOF according to an embodiment of the invention, and may thus be protected from touch and/or environmental influences.

Figure 3C:
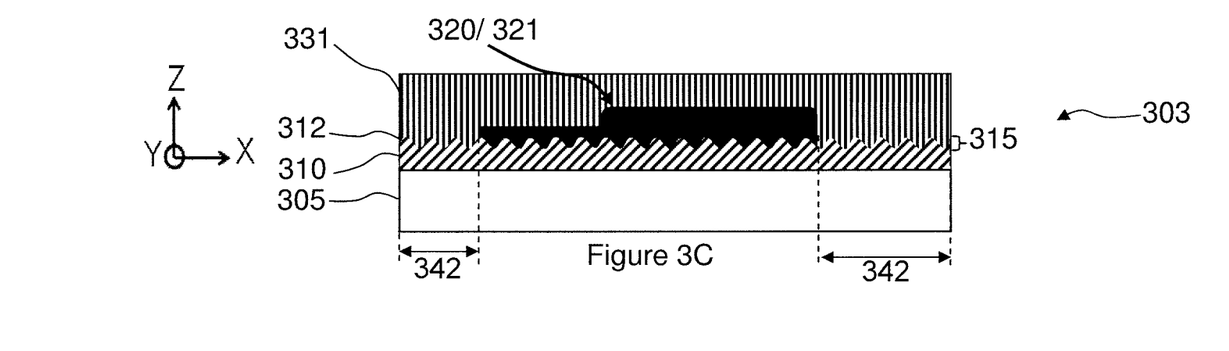
FIG. 3C is a schematic illustration of a zero-order diffractive filter according to a yet other embodiment of the invention.
Figure 3D:
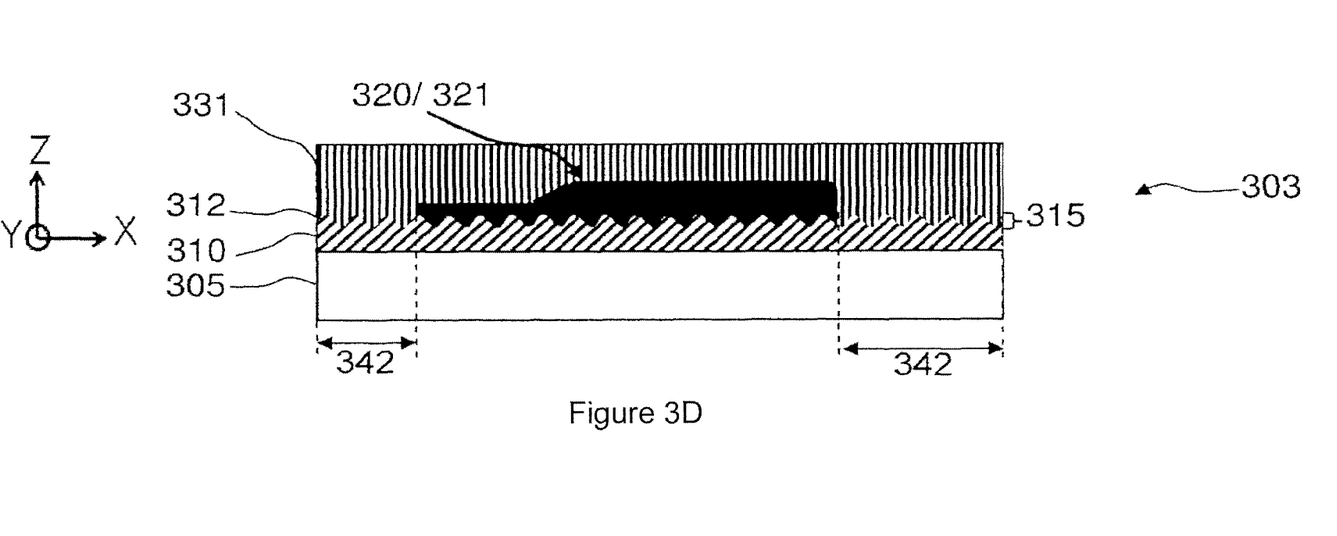
FIG. 3D is a schematic illustration of a zero-order diffractive filter according to a yet further embodiment of the invention.

As is schematically illustrated with reference to FIG. 3B a ZOF 302 and a ZOF 303, respectively, may include second low-index matter 330. In some embodiments, low-index matter 330 engages with both the upper surfaces of both the high-index material 320 and first low-index matter 310. Accordingly, high-index islands 320A and 320B are embedded from above and their sides by second low-index matter 330, and from below from first low-index matter 310. Specifically referring to FIG. 3C, a high-index material 320 may in some embodiments of the invention be vertically structured, i.e., height of high-index material 320 may vary as a function of its lateral position. Such a high-index material and is thus with respect FIG. 3C referred to as a height-patterned structure 321. Height-patterned structure 321 may be at least partially embedded between first low-index matter 310 and second low-index matter 331. By employing wet-coating techniques, the vertical structuring may be accomplished in one step. Wet-coating techniques that may be employed for such vertical structuring may include, for example, gravure printing by varying the parameter of the gravure cylinder such as the depth of the cups. Such ZOFs show multi-color effects as different waveguiding layer thicknesses result in different resonance conditions for the ZOF. The crossover between parts of different layer thicknesses can be in step form (as schematically shown in FIG. 3C) or as a gradient (as schematically shown and exemplified in FIG. 3D). Combining the laterally and optionally vertically patterned waveguiding layer and the laterally patterned microstructures (i.e., lower diffractive grating structure 315) results in a complex color effect which is extremely difficult to counterfeit.

According to some embodiments of the invention, the indices of refraction of first and the second low-index matter of a ZOF according to an embodiment of the invention may be at least approximately equal. In the latter embodiments, first or higher order diffraction effects disappear in the lateral positions that are free of any interlaying high-index material 320, i.e., in merged areas 342. Such merged-areas 342 are high-index-free areas is substantially free of diffraction-effects on light.

Figure 4A:
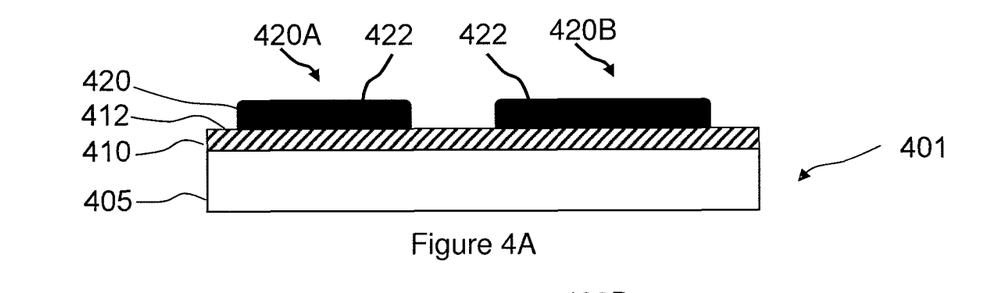
FIG. 4A a schematic illustration of a zero-order diffractive filter according to an alternative embodiment of the invention.
Figure 4B:
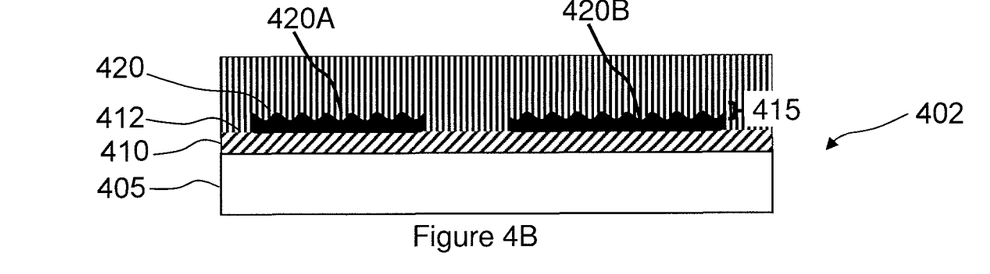
FIG. 4B is a schematic illustration of a zero-order diffractive filter according to a yet alternative embodiment of the invention.
Figure 4C:
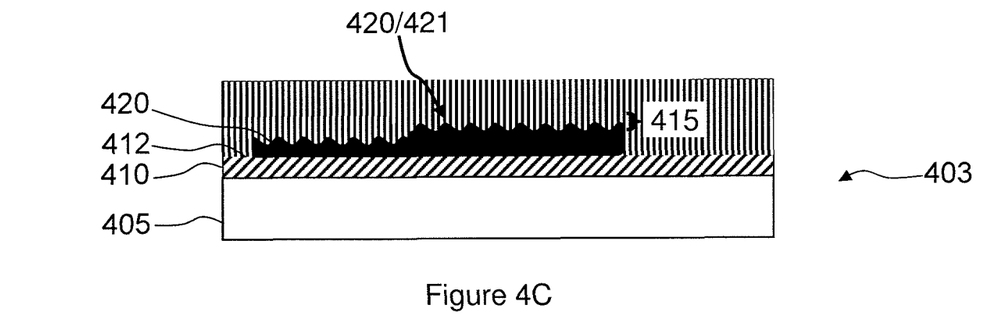
FIG. 4C is a schematic illustration of a zero-order diffractive filter according to a further alternative embodiment of the invention.

Reference is now made to FIGS. 4A, 4B and 4C. It should be noted that the same or analogous principles, embodiments and procedures outlined herein thus far may be applicable with respect to the description of the ZOFs schematically illustrated in FIGS. 4A, 4B and 4C. Therefore, to simplify the discussion that follows, some features described herein above may not be mentioned herein with respect to FIGS. 4A, 4A and 4C. However, this should by no means to be construed as limiting.

According to some embodiments of the invention, the method for manufacturing a ZOF like, e.g., ZOF 401, includes the procedure of providing first low-index matter 410, which may optionally be provided on a substrate 405. In the embodiment wherein, a ZOF like, e.g., ZOF 401, is free of substrate 405, then first low-index matter 410 constitutes a substrate. Providing first low-index matter 410 is accomplished by employing a wet-coating process, e.g., as known in the art. Analogous to what is described above with reference to FIG. 3A, first low-index matter 410 covers at least partially substrate 405. The low-index matter may cover the substrate entirely. Alternatively, first low-index matter 410 may cover substrate 405 only partially and may be, for example, laterally patterned (not shown).

First low-index matter may have a thickness ranging, for example, between 200 nm and 10 μm. In the embodiments exemplified in FIGS. 4A, 4B and 4C, upper surface 412 is at least approximately flat. However, this should by no means to be construed as limiting. Accordingly, in an embodiment of the invention, upper surface 412 of the low-index matter may be at least partially microstructured (not shown).

According to an embodiment of the invention, the method for manufacturing includes the procedure of providing high-index material 420 having an upper surface 412 onto first low-index matter 410 such to partially cover the latter according to a predetermined pattern, by employing a wet-coating technique. Specifically, high-index material 420 may cover first low-index matter 410 partially, for example, in a laterally patterned manner forming high-index islands 421.

In an embodiment of the invention, high-index material 420 is provided onto first low-index matter 410 such to form on the latter logos, images, barcodes, and the like.

Only those parts of the device which are covered by high-index material 420 show zero-order diffraction color effect in a ZOF according to an embodiment of the invention like, e.g., ZOFs 401, 402 and 403.

According to an embodiment of the invention, an upper diffractive grating structure 415 is provided on upper surface 412 employing, for example, hot- or UV-embossing. Examples of embossable high-index materials 420 include, but are not limited to, blends of polyvinyl alcohol (PVA) comprising $TiO_2$ nano-particles; or gelatin comprising PbS.

By employing wet-coating techniques according to embodiments of the invention, nanoparticles that may be present in high-index matter remain separated from one another. Otherwise stated, the agglomeration of the nanoparticles is prevented.

According to an embodiment of the invention, the minimal size of each individual high-index island 421 is, for example, at least four times the grating period of diffractive grating structure 415 in any lateral direction. The size of such high-index islands may be in the range of, for example, 10 µm up to 100 mm, between 20 µm and 20 mm, between 50 µm to 5 mm, or 50 µm and 1 mm.

According to some embodiments of the invention, a second low-index matter may be provided. In an embodiment wherein high-index material covers the low-index matter, the second low-index matter is provided onto the high-index material only. In the embodiment exemplified and schematically illustrated in FIGS. 4A, 4B and 4C, wherein high-index material 420 cover first low-index matter 410 only partially, then second low-index matter 430 is provided on both first low-index matter 410 and high-index material 420. Specifically, second low-index matter 430 is provided directly onto first low-index matter 410 where no interlaying high-index islands like, e.g., high-index islands 420A and 420B, are present. As is schematically illustrated in FIGS. 4B and 4C, providing second low-index matter 430 renders high-index material embedded in ZOF 402 and 403, respectively. Accordingly, high-index material may be protected from touch or environmental influences.

According to some embodiments of the invention, a ZOF may include an adhesive layer (not shown) that is adhesive with other substrates such as, for example, e.g. Banknotes, Passports, and the like. The method may therefore include according to some embodiments of the invention the procedure of providing the adhesive layer onto second low-index matter 430; if present, onto substrate 405; or onto first low-index matter 410. Providing the adhesive layer onto substrate 405 or first low-index matter 410 may require flipping of a ZOF like, e.g., ZOF 402 or 403. The adhesive layer may be, for example, a thermo-activatable adhesive layer.

Figure 4D:
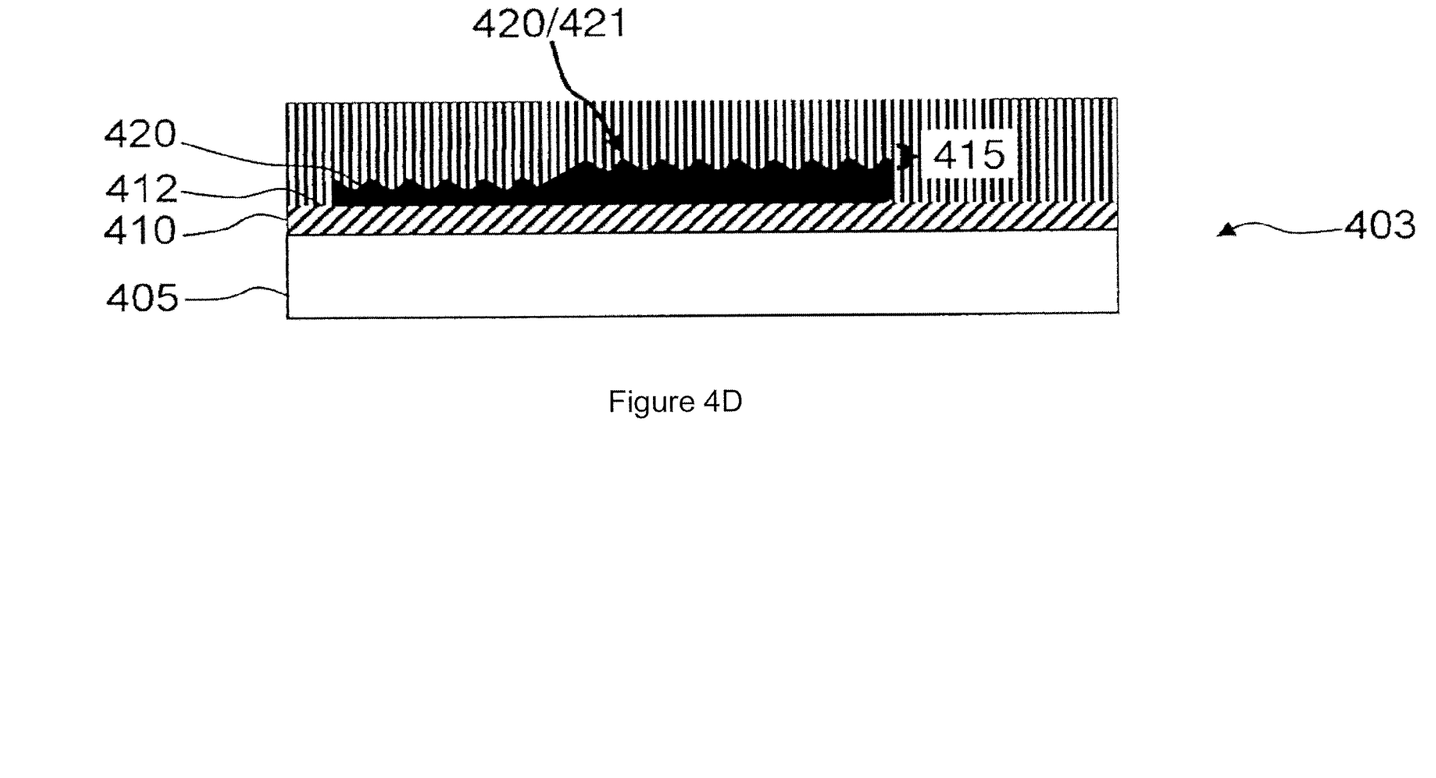
FIG. 4D is a schematic illustration of a zero-order diffractive filter according to a yet further alternative embodiment of the invention.

As is schematically illustrated in FIG. 4C, a ZOF according to an embodiment of the invention like, e.g., ZOF 403, includes high-index material 420 that may be vertically structured. Otherwise stated, height of high-index matter may be non-uniform (analogous to what is described with respect to high-index material 320 in FIG. 3C). Such vertically structured high-index material 420 is hereinafter referred to as height-patterned structure 421. By employing wet-coating techniques, the vertical structuring may be accomplished in one step. Wet-coating techniques that may be employed for such vertical structuring may include, for example, gravure printing by varying the parameter of the gravure cylinder such as the depth of the cups. Such devices will show multi-color effects as different waveguiding layer thicknesses result in different resonance conditions for the ZOF. The crossover between parts of different layer thicknesses can be in step form (as schematically shown and exemplified in FIG. 4C) or as a gradient (as schematically shown and exemplified in FIG. 4D).

Combining the laterally and optionally vertically patterned waveguiding layer and the laterally patterned microstructures results in a novel color effect or even in a color effect pattern, providing increased security against counterfeiting.

All processes mentioned in the embodiments can be done in roll-to-roll or sheet-to-sheet processes. In embodiments, the high-index material is applied by employing a method which permits the application of highly homogeneous layer thicknesses over large areas. Homogeneity of the layer thickness of the high-index material is required in order to ensure a uniform color appearance in the finished ZOF. The tolerances are for example, +−5%, or <=+−2%.

A wet-coating technique includes according to an embodiment of the invention, the employment of a printing method in which the coloring substance or the lacquer is applied from a temperature-regulated coating pan with a dipping roller and a transfer cylinder onto the printing cylinder, wherein substantially only the depressions of the printing cylinder are filled with the coloring or the coating substance. Excess coloring or coating substance may be removed by an excess remover such as, for example, a blade and optionally by a blowing strip.

Substrates 305 and 405 may be made, for example, of silicon wafers, glass, quartz, paper, polymer foils, and or any other suitable material. Specifically, the materials may be flexible films of synthetic materials like, for example, of PI, PP, MOPP, PE, PPS, PEEK, PEK, PEI, PSU, PAEK, LCP, PEN, PBT, PET, PA, PC, COC, POM, ABS, PVC. Substrates 305 and 405 may have a thickness ranging for example, from 5 µm to 700 µm, from 8 µm to 200 µm, or from 12 µm to 50 µm. In some embodiments, metal foils like, for example Al, Cu, Sn, Ni, Fe or special steel foils having a thickness ranging for example, from 5 µm to 200 µm, from 10 µm to 80 µm, or from 20 µm to 50 µm may be employed for substrates 305 and 405. Such foils may in some embodiments be surface-treated, like, e.g., coated and/or laminated, for example with adhesion promoting materials and/or they can be lacquered. Alternative materials that may be employable for implementing substrates 305 and 405 may include, for example, cellulose-free or cellulose-containing paper, thermally activatable paper or composites with paper, for example composites with synthetic materials having a weight per unit area of 20-500 g/m$^2$ or 40-200 g/m$^2$. In some embodiments, substrate 305 and 405 may be coated with a release layer to enable the transfer of the deposited layer setup on other substrates, e.g. banknotes or passports.

Examples of embossable materials suitable for the implementation of first low-index matter 310 and 410 include, for example, synthetic organic materials such as thermoplastic acrylic lacquer or UV-curable organic materials, particularly polymer. Concrete examples are ethylene vinyl acetate, polyvinyl acetate, polystyrene, polyurethane and combinations thereof. If first low-index matter 310 and 410 possesses an at least approximately flat surface, they may also be made of, for example, color or lacquer systems based on nitrocellulose, epoxy, polyester, colophonium, acrylate, alkyd, melamine, PVA, PVAc, PVC, isocyanate or urethane systems.

According to embodiments of the invention, waveguiding high-index material or layer 320 and 420 is made of organic material. Examples include high-index refraction polymers. Alternatively high-index material 320 and 420 may be made of by hybrid materials comprising inorganic nano-particle or flakes embedded in an organic matrix. The refractive index of the nano-particle or flakes is higher than the one of the organic matrix. Examples of such inorganic nanoparticles include PbS, $TiO_2$, $SiO_2$, $Al_2O_3$ and $ZrO_2$. The organic matrix can be e.g. gelatin, nitrocellulose NC, Poly(ethylene oxide) PEO, Poly(diallyldimethylammonium chloride) PDADMAC, Poly (vinyl alcohol) PVA or Poly(vinyl pyrrolidone) PVP and the like. For example, Zimmermann et. al. discloses in J. Mater. Res., Vol. 8(7), 1993, p. 1742-1748, compositions comprising PbS nanoparticles and gelatin, having refractive indices of up to 2.5. Such compositions are suitable for forming waveguiding layers of ZOFs according to the embodiments of the invention. According to some embodiments, the size of the nano-particles or flakes is at least in one special direction in the range of, e.g., 5 nm to 200 nm or, for example, between 10 nm and 60 nm. Furthermore, the particle size distribution may be preferably low. Still another possible material for the waveguiding layer is titanium dioxide ($TiO_2$) paste, e.g. HTL/SC from Solaronix SA (Solaronix http://www.solaronix.com/products/spincoatingtitania/tinanoxidehtlsc/, website visited Jun. 14, 2010). This paste consists of $TiO_2$ nanoparticles have a size of about 9 nm and thus perfectly fit into the grooves of the grating. The solid content of this paste is at least approximately 3%. A heat treatment (e.g. 2 minutes at 130° C.) of the printed material is done in order to sinter the nanoparticles into a solid $TiO_2$ film.

A special type of hybrid materials that can be used as waveguiding second layer is organometallic polymer. When cured at elevated temperatures, the organometallic polymer decomposes to form a highly dispersed metal oxide phase that imparts high index properties to the final hybrid coating. Such hybrid materials are described in "High-refractive-index polymer coatings for optoelectronics applications" in Advances in Optical Thin Films. Edited by Amra, Claude; Kaiser, Norbert; Macleod, H. Angus. Proceedings of the SPIE, Volume 5250, pp. 423-434 (2004), http://dx.doi.org/10.1117/12.513363.

According to embodiments of the invention, high index of refraction polymers that may be employed for implementing high-index material 320 and 420 are for example the OptiNDEX series (Brewer Science Inc., USA) as disclosed in "Thin-film polyetherimides with controlled refractive indices" in Organic Photonic Materials and Devices VI. Edited by Grote, James G.; Kaino, Toshikuni. Proceedings of the SPIE, Volume 5351, pp. 276-283 (2004), http://dx.doi.org/10.1117/12.529576. An alternative are the polymers of the C-imide series (Optmate Corporation, Japan with $n_{high}$ up to 1.78 at a wavelength of 589 nm.

To further illustrate the invention, the following examples are provided, with no intention to limit the scope of the invention. On top of a substrate like, e.g., substrate 405, which may be implemented with PET and which may have a thickness of, e.g., 23 μm, first low-index matter 410 is provided by employing, e.g., gravure printing. First low-index matter 410 may have a thickness of, e.g., 2 μm and may be made of e.g., Nitrocellulose (E330 of Dow Chemical Company). The Nitrocellulose (NC) may be dissolved in methanol (polarity index P=5.1) and the final layer thickness may be, for example, 2 μm. Subsequently, high-index material 420 is provided, which may be implemented with high-index refraction polyimide (OptiNDEX B44 of Brewer Science Inc) dissolved in cyclohexanone (P=4.5). High-index material 420 may be provided by deposition on top of first low-index matter using, for example, gravure printing. The layer thickness of high-index material 420 may, for example, be about 300 nm. The layer of first low-index matter implemented with NC may thus have an index of refraction of, e.g., at least approximately 1.54 for a wavelength of 510 nm. The layer of high-index material 420 implemented in an embodiment with polyimide may have an index of refraction of at least approximately 1.72. Thereafter, upper diffractive grating structure 415 of, e.g., Λ=400 nm, t=180 nm, may be provided by hot-embossing of high-index material 420 in a static press with a Ni-shim at a temperature of approx. 150° C. and with a pressure of 4 tons on 25 cm².

By employing a wet-coating technique according to an embodiment of the invention, the manufacturing of a ZOF may be performed with shadow-mask-free procedures. The output rate of ZOFs manufactured according to embodiments of the invention may be, for example 100 m²/min in, e.g., roll-to-roll processes.

It will be appreciated by persons skilled in the art that the disclosed invention is not limited to what has been particularly shown and described hereinabove.

What is claimed is:

1. A zero-order diffractive filter comprising:
a first low-index matter;
a second low-index matter;
a high-index material comprising diffractive microstructures and having an upper surface and a lower surface, wherein the high-index material is positioned between the first low-index matter and the second low-index matter;
wherein the lower surface of the high-index material is adjacent to the first low-index matter and wherein the upper surface is adjacent to the second low-index matter;
wherein the high-index material has an index of refraction that is higher than a respective index of refraction of the first low-index matter and the second low-index matter, the high-index material acting as a waveguiding layer for guiding light between the first and second low-index matters;
wherein the high-index material is laterally patterned on the low-index matter, such that at least one high-index-free area is present where the first low-index matter and the second low-index matter engage with each other and form a merged area and at least one non-merged area of high-index material is present forming with the first and second low index matter a zero-order diffractive structure,
wherein the high-index material comprises a first portion of high-index material having diffractive microstructures and a first thickness laterally contiguous with a second portion of high-index material having diffractive microstructures and a second thickness different than the first thickness, and
wherein the zero-order diffractive structure exhibits at the first and the second portions of the high-index material respective color effects.

2. The zero-order diffractive filter according to claim 1, wherein in the at least one high-index free area the index of refraction of the first low-index matter is at least approximately equal to the index of refraction of the second low-index matter.

3. The zero-order diffractive filter according to claim 1, wherein the at least one high-index-free area is substantially free of diffraction-effects on light.

4. The zero-order diffractive filter according to claim 1, wherein the high-index material between the first and the second low-index matter has predetermined vertical dimensions.

5. The zero-order diffractive filter according to claim 1, wherein the high-index material has an index of refraction n that is higher than 1.8.

6. The zero-order diffractive filter according to claim 1, wherein the high-index material comprises nano-structured material.

7. The zero-order diffractive filter according to claim 1, wherein the high-index material comprises organic material.

8. The zero-order diffractive filter according to claim 1, wherein the laterally patterned high-index material is patterned in the shape of at least one of the following: a macroscopic grid-like structure, an arbitrary shape, a circular shape; an oval shape; a polygonal shape; and a graphic symbol.

9. The zero-order diffractive filter according to claim 1, wherein the laterally patterned high-index material forms islands having lateral dimensions ranging between 10 μm to 100 mm.

10. The zero-order diffractive filter according to claim 1, wherein the second low-index matter constitutes a protective layer for the high-index material.

11. The zero-order diffractive filter according to claim 1, wherein a transition from the first portion to the second portion is a step-like transition.

12. The zero-order diffractive filter according to claim 1, wherein a transition from the first portion to the second portion is a gradient transition.

* * * * *